Figure 1:
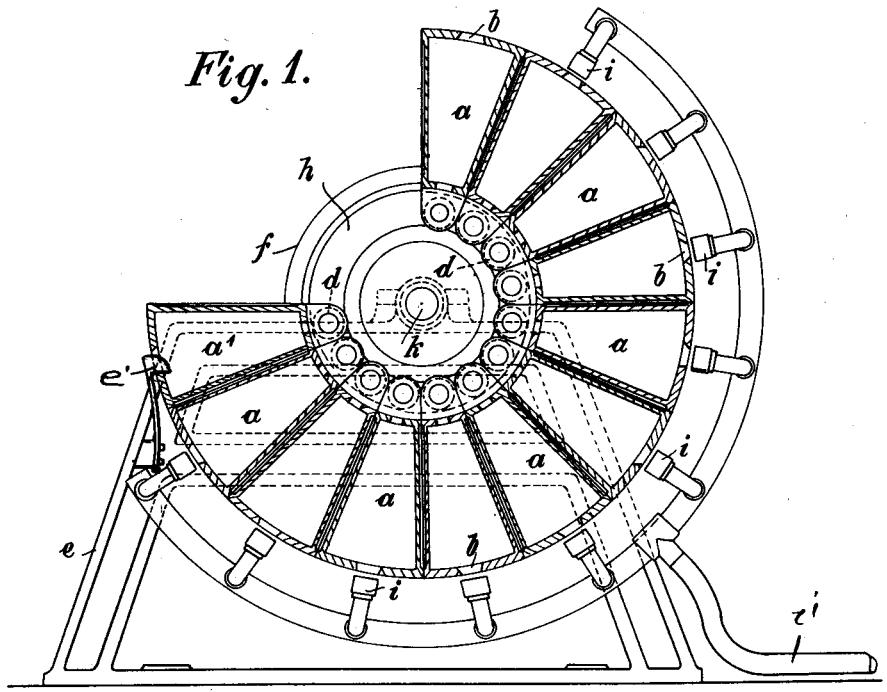

Sept. 8, 1931.  O. G. L. DANGER  1,822,803
MACHINE FOR AUTOMATICALLY BAKING WAFFLES AND THE LIKE
Filed June 15, 1925   3 Sheets-Sheet 1

Inventor:
O. G. L. Danger

Sept. 8, 1931.   O. G. L. DANGER   1,822,803
MACHINE FOR AUTOMATICALLY BAKING WAFFLES AND THE LIKE
Filed June 15, 1925   3 Sheets-Sheet 2

Inventor:
O. G. L. Danger

Sept. 8, 1931.  O. G. L. DANGER  1,822,803
MACHINE FOR AUTOMATICALLY BAKING WAFFLES AND THE LIKE
Filed June 15, 1925  3 Sheets-Sheet 3
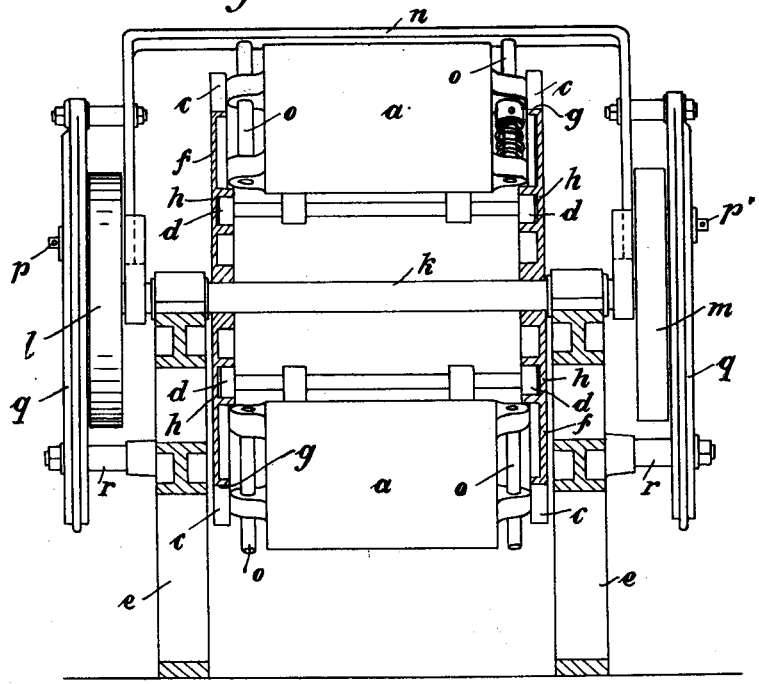
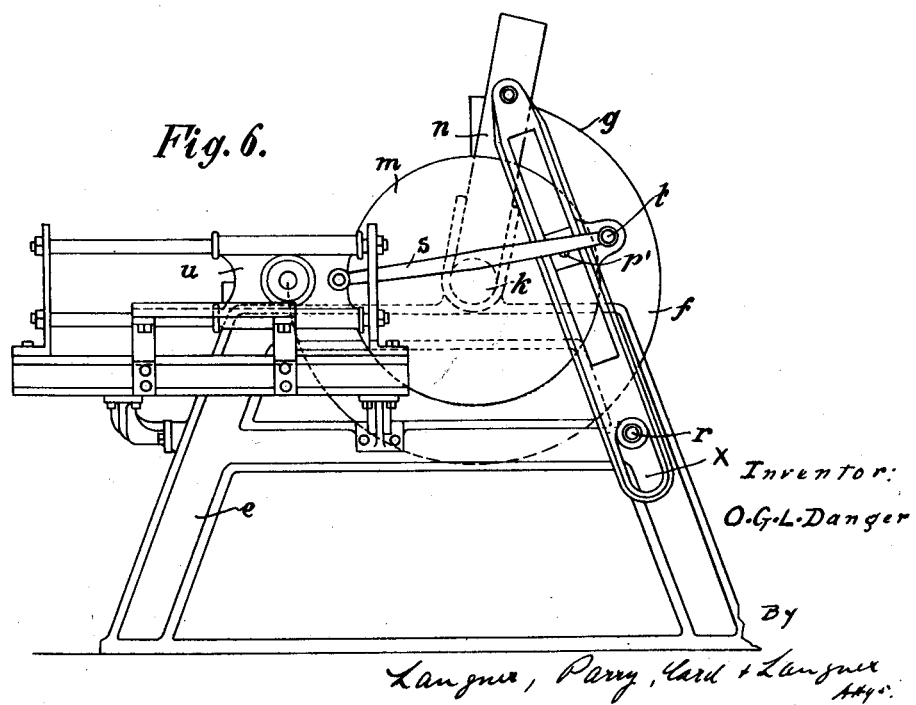

Patented Sept. 8, 1931

1,822,803

UNITED STATES PATENT OFFICE

OTTO GEORG LOUIS DANGER, OF HAMBURG, GERMANY, ASSIGNOR TO THE FIRM H. DANGER, OF HAMBURG, GERMANY

MACHINE FOR AUTOMATICALLY BAKING WAFFLES AND THE LIKE

Application filed June 15, 1925, Serial No. 37,330, and in Germany June 18, 1924.

The production of waffles heretofore has been carried out by means of jointed forms or waffle-irons consisting of a bottom and a top hinged together and heated separately.
These jointed forms are carried along in a suitable machine from the point where the waffle-paste or batter is filled in, to the place of heating and then to the point where the baked waffles are removed. For so baking waffles the joint-forms, which are arranged at a certain distance from one another, necessitate quite a large room for the machine, into which they are to be placed, and in which they are carried along and singly opened and closed.
Since these forms are opened at the place of emptying and filling and since they must be separated from one another for a certain distance, the heat that must be employed is not properly conserved. Thus the heat will escape at the open end of the machine without being made use of to the discomfort of the attendant.

By a new method of treating the forms in emptying and filling in the paste or batter and by a new construction and arrangement of the forms, the dimensions of the machine can be considerably reduced and the heat can be economically utilized. According to the invention the removal of the baked waffles and the filling in of the waffle-paste can be carried out by simply turning round one form from another form to a third form. To make this possible each form is made in a single piece shaped on both sides so as to cooperate with the forms between which it lies constituting alternately and successively the top of one and the bottom of the other according to the direction in which it is shifted. The method is then carried out in this way, that from a row of forms placed one beside the other, the form spaces are successively filled with waffle-paste, baked, and the last form is taken away from the free end of the row which, after removing the ready baked waffle is then placed at the other end of the row on top of the form that has been last filled with waffle-paste. In this way the forms are taken off one from one end of the row after the other and again added at the other. The intermediate form plates are heated by a gas flame or electrically. The forms for this purpose are provided with a hollow interior into which the heating gas is introduced, or in which the electric rheostat is arranged. Since the forms close upon one another without intermediate spaces the heat will be fully made use of, and thus a great saving of fuel results.

The arranging of the forms in a row is preferably carried out in this way, that the row constitutes an open ring rotatable in a vertical plane, whereby the form at one end of the open ring lying horizontally will be filled with the waffle-paste, and the form at the other end of the annular ring is taken away and placed on the first newly filled form, thus exposing the ready baked waffle on the second form. The device for taking away and opening the forms is so constructed that it applies pressure to the opened form, whereby the ring or row of forms is rotated to such an extent, that the end forms will always be in same position.

A machine for carrying out the invention is shown in the drawings.

Figure 7:
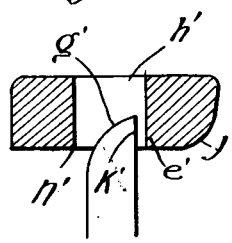
Figure 2:
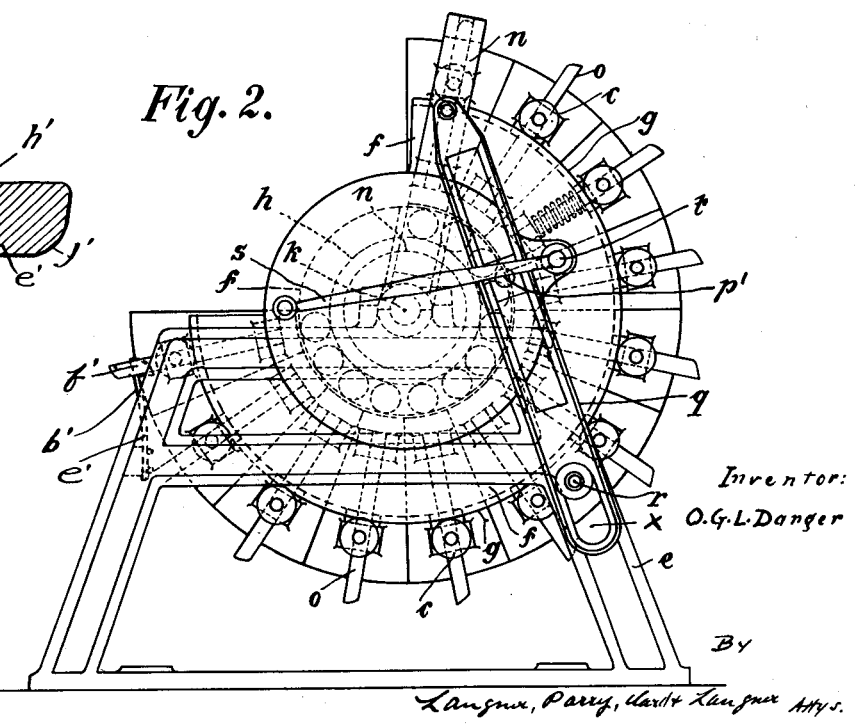
Figure 3:
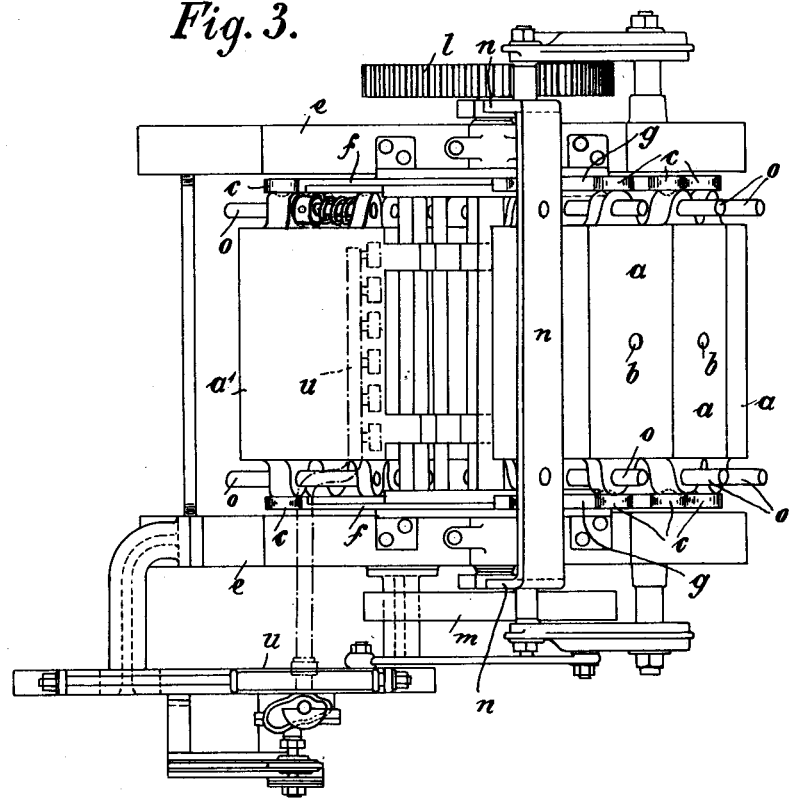
Figure 4:
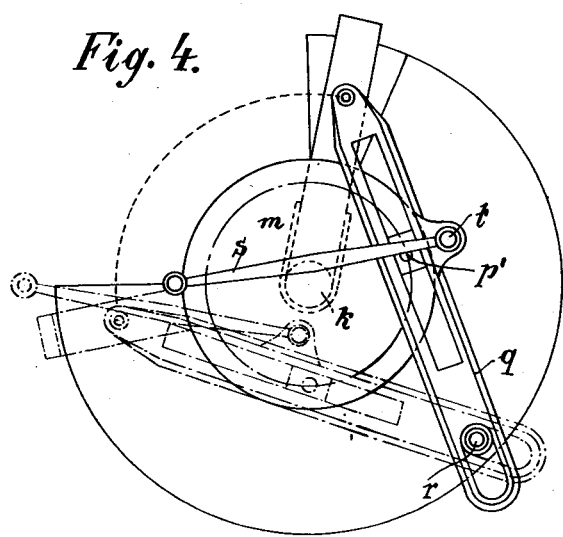

Fig. 1 is a vertical section of the machine,
Fig. 2 an end view part of it being left away for clearness sake,
Fig. 3 is a plan, and
Fig. 4 an end view of one part of the machine.
Fig. 5 is a section drawn to right angles to that of Fig. 1, and
Fig. 6 is another end view of the machine corresponding to Fig. 2, other parts being left away.
Fig. 7 is a section through the transverse part of the yoke in the plane of one of the bolt receiving apertures showing the coacting cam surfaces by means of which the bolts are engaged by the yoke and released.

Each form $a$ constitutes a radial cylindrical segment in such manner that the forms placed close to one another form an open ring. The two radial end faces of the forms are provided with embossed half spaces so that the adjoining side faces of the two forms $a$ constitute the complete space for the waffle. The forms are hollow and provided at their outer sides with an opening for the introduction of heated gas. Near the outer side and near the inner side every form is provided on both end faces with rollers $c$ and $d$. At the inner side of the two brackets $e$, a guide plate $f$ is attached and provided with a broken outer flange $g$ and an annular groove $h$ concentric to the said outer flange. The rollers $c$ bear against the two faces of the flange $g$, and the rollers $d$ run within the annular groove $h$ holding the forms $a$ in their place side by side, the complete row of forms thus being rotatable about the axis of the flange $g$ and the groove $h$. The row of forms is so adjusted that its open part coincides with the opening in the circular flange $g$ of the guiding plate $f$, whereby the outer face of the form $a'$ at the end of the ring is horizontal. In order to secure this horizontal position in spite of the overweight by the larger number of forms on the opposite side, a locking device $e'$ is mounted on one of the brackets $e$ for holding the row of forms so that the form $a'$ cannot be pressed upwardly. Said locking device may consist of a resilient shank $b'$ carrying a latching nose $f'$ having an inclined face directed toward the direction of rotation of the ring of forms, and an abrupt shoulder below. The cam normally holds that form which is in horizontal position against free rotation in a clockwise direction, until the form on the other side of the gap in the circle of forms descends upon the horizontal form and lies flat upon it. Then when the circle of forms is rotated counter-clockwise, the latching nose $f'$ slips out of the gas aperture in which it is seated permitting the rotation of the entire ring of forms until the yoke reaches the limit of its range of movement in the counter-clockwise direction, at which point the upper surface of the form $a'$ comes into a horizontal plane. At this point the latching nose $f'$ enters the gas admitting aperture $b$ of the form $a'$. When the direction of oscillation of the yoke is reversed by the operating means, the abrupt shoulder of the latching nose engages the form $a'$ preventing reverse movement of said form and of the entire ring. The locking device however is so arranged that it allows of a rotation of the circular row in the counter-clockwise direction, as shown.

Opposite the openings $b$ of the forms $a$ gas feed pipes $i$ are arranged branching off from a common pipe $i'$. The heat of the conical flame entering the forms will take effect on the side walls of the forms towards the center line in equal distribution.

The charging of the form $a'$ when in horizontal position by waffle paste or batter is carried out by the aid of a known squirting device, the squirting nozzle being adapted to reciprocate over the half of the form space lying outside the form $a'$. The main parts of the squirting device are shown in Fig. 3, which is operated by the device for opening the forms.

The shaft $k$ which is journaled in the brackets $e$ carries a gearing $l$ outside of the brackets and adapted to be operated by a motor, and on the other side a disk $m$ is carried by said shaft. Intermediate of the two brackets a yoke $n$ is rotatably arranged on the shaft $k$, the two ends of the shanks of this yoke embracing the shaft. Every form $a$ is provided at its end faces with a bolt $o$ arranged suitably in guides and acted upon by a spring, said bolts each having an oblique end $g'$ facing the transverse part of the yoke, said central part being perforated by two openings $h'$, the edge of said yoke in the vertical plane of said openings being bevelled as indicated at $j'$ in Figure 2 on that side which meets the bolts $o$ when the yoke is moved in a clockwise direction. When the bevelled portion of the yoke meets the oblique face $g'$ of the bolt $o$ the latter is depressed, the yoke riding over said bolt until the latter springs into the opening $h'$. When the yoke moves in a counter clockwise direction from vertical to horizontal position, the parallel confronting portions $k'$ of the bolt and $l'$ of the yoke, make contact so that the bolt cannot escape from the yoke and the form to which the bolt is attached moves with the yoke to horizontal position, the entire ring of forms being in the meantime advanced until the next form $a$ assumes a position to be next engaged by the yoke. Upon initial return movement of the yoke in a clockwise direction the oblique face $g'$ of the bolt makes contact with the edge $n'$ of the wall of the aperture $h'$, and since the form with which the bolt is associated is now held down by the latching nose $f'$, the bolt $o$ is immovable angularly so that it is depressed against the spring by pressure of the edge $n'$ becoming thus released from the yoke, the yoke returning to vertical position to engage another form.

The oscillation of the yoke $n$ in one and the other direction is carried out as follows:

A pin $p$ is mounted on the gear wheel $l$ and another pin $p'$ is mounted on the disk $m$ in alignment with the pin $p$, the wheels $l$ and disk $m$ thus forming shanks and the pins $p$ forming crank pins, which engage by a slidable member a longitudinal slot of two arms $q$. One of the free ends of the latter is rotatably connected with the shanks of the yoke $n$, while the other end, by the aid of a short slot $x$, is guided on a stud $r$ mounted on the bracket $e$. On rotation of the shaft $k$ forming together with the wheel $l$ and disk $m$ a crank shaft, the arms $q$ are so moved by the pins $p$, that the yoke $n$ is moved from the approximately vertical position, Fig. 2, into a horizontal position and back again, whereby the yoke $n$, as described above, carries the form from the upper end of the row of forms to the other end and places it on the form a' lying at this end, and also rotates the complete annular row of forms. When one form is taken away from the upper end of the row a ready baked waffle is exposed and can be taken off.

While the arm q is held in the position shown in dotted lines in Fig. 4, the yoke n being turned down into its lower position, the latter will remain a sufficient long time in such position, so that during this time the paste-squirting device u will be moved across the form a' there and back. The squirting device is operated by the rod s rotatably attached by a pin t to the arm q.

When the forms a are heated by electricity the electric heating lamps or heating devices are arranged in the inside of the forms, which in such case need only a small amount of heat. The number of forms may then be increased correspondingly. The current can be supplied by suitable brushes, sliding contacts and the like.

The rods o may be left away and a yielding bolt or the like may be attached to the yoke in substitution, adapted to engage corresponding openings in the forms.

I claim:

1. In a waffle baking machine, a continuous series of sector-shaped forms revolvable about a horizontal axis and arranged in a group in contacting relation, through an angular space of less than 360°, leaving a gap, each form being indented on both sides, and means for successively transferring each form at said gap from closed relation with the adjacent form on one side to closed relation with the adjacent form on the other side, said means including a yoke adapted to oscillate about the axis of revolution of said forms, means for oscillating said yoke, and cooperating means carried by said yoke and forms for engaging each form when both of said members are in substantially vertical position and releasing each form when said members are in substantially horizontal position.

2. In a waffle baking machine according to claim 1, a crank shaft journalled axially of the path of revolution of said forms, through which said forms are driven, an arm rotatably connected at one end with said yoke and provided at the other with a slot, a fixed stud engaging said slot, a second slot in said arm intermediate one of its ends, a slidable member guided within said second slot and operated by said crank shaft.

3. In a waffle-baking machine, a series of forms having baking faces on opposite sides, a horizontal axis about which said forms are revoluble, the forms of said series being normally disposed, with their baking faces in contact, through an angular space of less than 360° leaving a gap between the end forms of the series, each form being provided in at least one face with a batter-receiving indentation completely surrounded by walls, which when said forms are in contact, cooperates with the adjacent contacting form to constitute a closed waffle-baking chamber, and means for transferring the forms successively across said gap as they assume a predetermined position in the revolution of said series, from closed relation with one end of the series to closed relation with the other end.

4. In a waffle-baking machine, a series of forms mounted for movement about a substantially horizontal axis, each provided with batter retaining indentations on both sides and cooperating with the adjacent forms so that the indentations of the contacting faces of adjacent forms constitute a completely closed waffle-receiving chamber, means for the successive step by step transfer of each form from closed relation with the adjacent form on one side, to closed relation with the adjacent form on the other side, the forms each having the shape of a sector, and the series of forms constituting an open ring, annular guides within which the series of forms is adapted to be guided in an endless path, and means for stopping the movement of the ring of forms when the advanced form of the pair ready to be emptied is in approximately vertical position, and the form ready to be filled in an approximately horizontal position.

5. In a waffle-baking machine, a series of forms mounted for movement about a substantially horizontal axis and arranged in a group in contacting relation, through an angular space less than 360°, leaving a gap, each provided with batter-retaining indentations on both sides and cooperating with the adjacent forms so that the indentations of the contacting faces of the adjacent forms constitute a completely closed waffle-receiving chamber, means for the successive step by step transfer of each form at said gap from closed relation with the adjacent form on one side to closed relation with the adjacent form on the other side, the forms being hollow, and means for introducing heat to the inside of said forms at each step of their movement.

In testimony whereof I have signed my name to this specification.

OTTO GEORG LOUIS DANGER.